United States Patent
Gensolen et al.

(10) Patent No.: US 8,139,823 B2
(45) Date of Patent: Mar. 20, 2012

(54) METHOD FOR CAPTURING IMAGES COMPRISING A MEASUREMENT OF LOCAL MOTIONS

(75) Inventors: Fabrice Gensolen, Montpellier (FR); Lionel Martin, Aix En Provence (FR); Guy Cathebras, Grabels (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 13/044,385

(22) Filed: Mar. 9, 2011

(65) Prior Publication Data

US 2011/0194734 A1     Aug. 11, 2011

Related U.S. Application Data

(62) Division of application No. 11/354,288, filed on Feb. 14, 2006, now Pat. No. 7,925,051.

(30) Foreign Application Priority Data

Feb. 17, 2005 (FR) .................. 05 001630

(51) Int. Cl.
G06K 9/00 (2006.01)
H04N 5/228 (2006.01)
H04N 5/33 (2006.01)
(52) U.S. Cl. .............. 382/107; 348/208.14; 348/169
(58) Field of Classification Search ............... 382/107, 382/256; 250/208.1; 396/53–55; 348/208.7, 348/208.8, 208.11, 208.99, 208.2, 208.4, 348/208.14, 208.13, 3, 73, 374, 376, 208.5, 348/208.6

See application file for complete search history.

(56) References Cited

U.S. PATENT DOCUMENTS

| | | | |
|---|---|---|---|
| 5,267,034 A | 11/1993 | Miyatake et al. | 358/105 |
| 5,278,663 A | 1/1994 | Hong | 358/335 |
| 5,781,648 A | 7/1998 | Sarpeshkar | 382/107 |
| 5,903,307 A * | 5/1999 | Hwang | 348/208.1 |
| 5,962,844 A | 10/1999 | Merrill et al. | 250/214 A |
| 5,998,780 A | 12/1999 | Kramer | 250/221 |
| 6,020,953 A | 2/2000 | Barrows | 356/28 |
| 6,023,521 A | 2/2000 | Sarpeshkar | 382/107 |
| 6,088,467 A | 7/2000 | Sarpeshkar et al. | 382/100 |
| 6,194,695 B1 | 2/2001 | Barrows | 250/208.1 |
| 6,212,288 B1 | 4/2001 | Sarpeshkar et al. | 382/107 |

(Continued)

FOREIGN PATENT DOCUMENTS

EP     0 395 271 A2     10/1990

(Continued)

OTHER PUBLICATIONS

Barrows, G., "Feature Tracking Linear Optic Flow Sensor for 2-D Optic Flow Measurement," *Conference on Control, Automation, Robotics and Vision, Proceedings* vol. 1: 732-736, 1998.

(Continued)

*Primary Examiner* — Andrae S Allison
(74) *Attorney, Agent, or Firm* — Seed IP Law Group PLLC

(57) ABSTRACT

A method for capturing a sequence of video images, using an imager including an estimation of the parameters of a model of global motion between successive images. The method may include measurement of local motions on edges of the images, with the estimation of the parameters of the global motion model performed using the result of the measurement of local motions on the edges of the images.

23 Claims, 6 Drawing Sheets

U.S. PATENT DOCUMENTS

| | | | |
|---|---|---|---|
| 6,212,289 B1 | 4/2001 | Sarpeshkar et al. | 382/107 |
| 6,253,161 B1* | 6/2001 | Arias-Estrada | 702/150 |
| 6,384,905 B1 | 5/2002 | Barrows | 356/28 |
| 6,455,831 B1* | 9/2002 | Bandera et al. | 250/208.1 |
| 6,493,068 B1 | 12/2002 | Barrows | 356/28 |
| 6,683,678 B2 | 1/2004 | Barrows | 356/28 |
| 6,686,954 B1* | 2/2004 | Kitaguchi et al. | 348/208.1 |
| 7,212,230 B2 | 5/2007 | Stavely | 348/208.1 |
| 7,307,653 B2* | 12/2007 | Dutta | 348/208.7 |
| 7,408,572 B2* | 8/2008 | Baxter et al. | 348/208.14 |
| 7,525,573 B2 | 4/2009 | Kakiuchi | 348/208.2 |
| 7,598,979 B2 | 10/2009 | Trutna, Jr. et al. | 348/208.4 |
| 7,925,051 B2* | 4/2011 | Gensolen et al. | 382/107 |
| 2003/0076421 A1* | 4/2003 | Dutta | 348/208.11 |
| 2005/0200712 A1* | 9/2005 | Uenaka | 348/208.99 |
| 2006/0061660 A1* | 3/2006 | Brackmann | 348/208.1 |
| 2006/0152590 A1 | 7/2006 | Kage et al. | 348/208.1 |
| 2009/0244298 A1* | 10/2009 | Liu et al. | 348/208.4 |

FOREIGN PATENT DOCUMENTS

EP   0 675 496 A2   10/1995

OTHER PUBLICATIONS

Harrison, R. et al., "An Analog VLSI Model of the Fly Elementary Motion Detector," *Advances in Neural Information Processing Systems, 10, Proceeding of the 1997 Conference*: 880-886, 1997.

Horiuchi, T. et al., "An Analog VLSI Saccadic Eye Movement System," *Advances in Neural Information Processing Systems*, 6: 582-589, 1994.

Moore, A. et al., "A Multiplication Based Analog Motion Detection Chip," *Visual Information Processing: From Neurons to Chips*, SPIE 1473: 66-75, 1991.

Tanner, J. et al., "An Integrated Analog Optical Motion Sensor," *VLSI Signal Processing, 2, IEEE Press*: 59-76, 1986.

Benson, G., et al., *Advances in Neural Information Processing Systems* 4, D.S. Touretzky, Ed., San Mateo, CA: Morgan Kaufmann, 1991. "Direction-Selective Silicon Retina that Uses Null Inhibition," pp. 756-763.

Delbrück, T., "Silicon Retina with Correlation-Based, Velocity-Tuned Pixels," *Neural Networks, IEEE Transactions on Circuits and Systems*, 4(3):529-541, May 1993.

Deutschmann, R., et al., "Compact Real-Time 2-d Gradient-Based Analog VLSI Motion Sensor," *Int. Conf. On Advanced Focal Plane Arrays and Electronic Cameras*, 1998.

Etienne-Cummings, R., et al., "A Focal Plane Visual Motion Measurement Sensor" *IEEE Transaction on Circuits and Systems—II: Fundamental Theory and Applications*, 44(1):55-66, Jan. 1997.

Lei, M-H. et al., "An Analog Motion Field Detection Chip for Image Segmentation," *IEEE Trans. on Circuits and Systems for Video Technology*, 12(5):299-308, May 2002.

Liu, S-C., "A Neuromorphic aVLSI Model of Global Motion Processing in the Fly," *IEEE Transaction on Circuits and Systems—II: Analog and Digital Signal Processing*, 47(12):1458-1467, Dec. 2000.

Higgins, C., et al., "Pulse-Based 2-D Motion Sensors," *IEEE Transaction on Circuits and Systems—II: Analog and Digital Signal Processing*, 46(6):677-687, Jun. 1999.

Kramer, J., et al., "Pulse-Based Analog VLSI Velocity Sensors," *IEEE Transaction on Circuits and Systems—II: Analog and Digital Signal Processing*, 44(2):86-101, Feb. 1997.

Stocker, A., et al., *Advances in Neural Processing Systems 11*, M. Kearns, S. Solla, and D. Cohn (Eds.), Cambridge, MA, MIT Press, 1999. "Computation of Smooth Optical Flow in a Feedback Connected Analog Network," pp. 706-712.

Stocker, A., "Analog VLSI Focal-Plane Array With Dynamic Connections for the Estimation of Piece-Wise Smooth Optical Flow," *IEEE Transaction on Circuits and Systems-I*, 51(5):963-973, May 2004.

Sarpeshkar, R., et al., "Analog VLSI Architectures for Motion Processing: from Fundamental Limits to System Applications," *Proceedings of the IEEE*, 84(7):969-987, Jul. 1996.

Torralba, A., et al., "An Efficient Neuromorphic Analog Network for Motion Estimation", *IEEE Transactions on Circuits and Systems I: Fundamental Theory and Applications*, 46(2):269-280, Feb. 1999.

\* cited by examiner

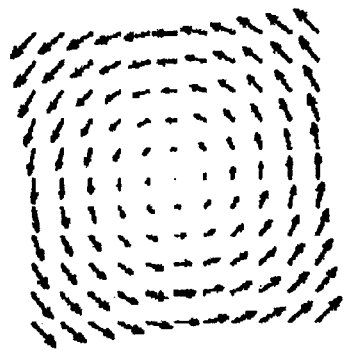
FIG. 4
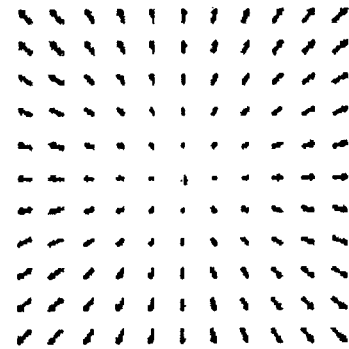
FIG. 5
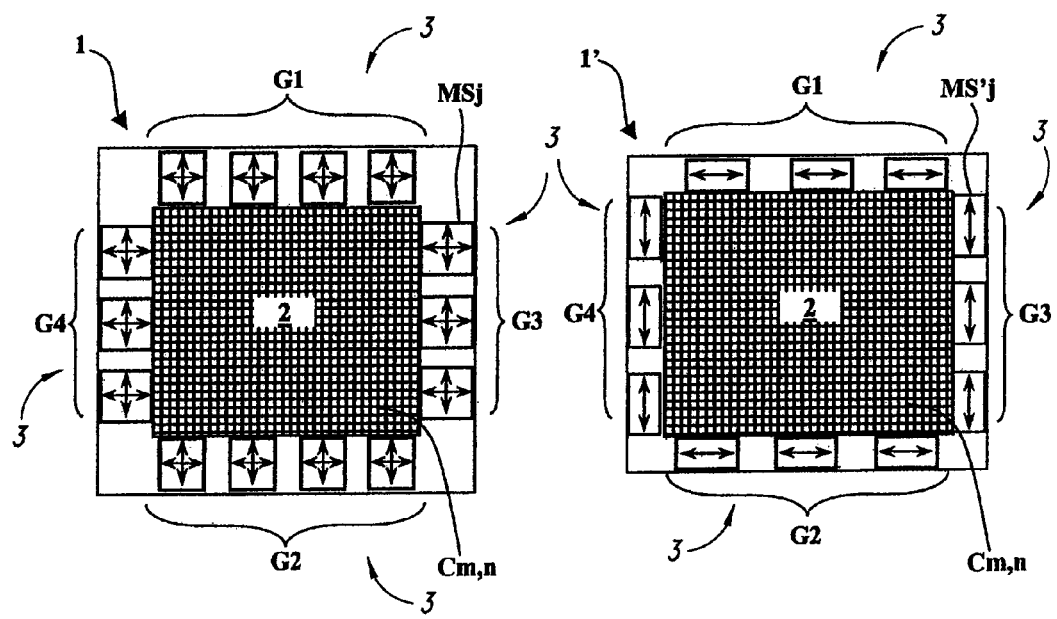
FIG. 6
FIG. 7

METHOD FOR CAPTURING IMAGES COMPRISING A MEASUREMENT OF LOCAL MOTIONS

BACKGROUND OF THE INVENTION

1. Field of the Invention

The present disclosure relates to imagers and more particularly to a method for capturing video images and a video imager enabling the global motion of the images to be determined.

2. Description of the Related Art

The spurious motions that accompany the recording of a video sequence considerably affect the quality of the sequence when the latter is then displayed on a screen. Today, numerous portable electronic devices, particularly cellular telephones, digital cameras, PDAs, etc. integrate means for capturing video sequences. Now, such portable devices are subject to trembling and other undesirable motions and the quality of the video sequences they produce is generally mediocre due to an obvious lack of stability of the image.

There are various known techniques for stabilizing the images of a video sequence, among which so-called pre-processing and post-processing techniques are distinguished.

Pre-processing stabilization techniques rely on the use of object lenses having inertially stabilized lenses, which automatically turn so that the incident light flux reaches the imager with an angle of incidence that varies sufficiently slowly to smooth the rapid variations caused by the spurious motions. It is therefore a sort of low-pass tremble filtering, produced optically and occurring at the moment the images are captured.

These techniques procure excellent results but the high cost of the stabilized lenses means they are reserved for top-of-the-range cameras. They are not therefore readily applicable to video devices integrated into low-cost products, such as those mentioned above. Web cameras are also concerned, as these do not generally have this type of lens.

Post-processing stabilization techniques are implemented by software and occur after the stage of capturing the images. They involve implementing image processing algorithms which are executed by integrated computation means such as DSPs (Digital Signal Processors). Post-processing stabilization techniques are generally based on detecting the global motion of the images in real-time, which enables the spurious motions (trembling) to be distinguished from the intentional motion, so as to keep the latter in the video sequence. Intentional motion, such as a zoom effect (narrowing or enlarging the shooting field) or a displacement of the shooting field for example, is generally a slow and steady motion compared to the spurious motion. It can thus be separated from the spurious motion by a temporal filtering operation of low-pass type.

However, to be truly efficient, known post-processing image stabilization techniques require substantial computing power and thus costly computation means such as the above-mentioned DSPs. As a result, although less costly to implement than the optic stabilization techniques, they are rarely implemented in low-cost applications such as video recording in cellular telephones or in web cameras, or even in certain camcorders. These devices therefore enable video sequences of mediocre quality to be produced.

BRIEF SUMMARY OF THE INVENTION

An embodiment of the present invention aims to provide a method for analyzing images enabling, in particular, video images to be post-process stabilized with a lower computing power than required by known post-processing techniques.

Generally speaking, the two-dimensional motion in a video sequence results from the projection onto an imager of the motion of the real objects in the scene filmed. This projection of a real three-dimensional scene in a two-dimensional plane means spatial information contained in the scene is lost, such that the processing of the images required to distinguish the intentional motion from the spurious motion is generally complex. Thus, as a compromise is reached between the computation load and the precision of the analysis, the motion is generally analyzed in a simplified manner. This is referred to as motion estimation. The estimation of the motion in a sequence of images is the estimation of the apparent motion of the scene projected onto a surface. In an environment with fixed lighting, the detectable motions are due firstly to the motions of the objects in the scene and secondly to those of the acquisition device. The latter form the global motion to be detected. Although this motion is directly measurable on the fixed background of the scene filmed, it is difficult to measure on objects animated by a specific motion considered spurious for the detection of the global motion.

The most direct way of estimating the global motion is to detect the motions of the fixed background of a scene. The global motion is then described by a model. This model is the result of a geometrical analysis of the motion by applying simplifying hypotheses about the structure of the scene sensed by the imager (considered to be quasi-plane for example), and is limited to a few parameters. In classical post-processing methods implemented in devices having a low computing power, the global motion model is simplified to the extreme so as to limit the computation load, by only considering for example translation motions in X and Y. However, it goes without saying that the video stabilization obtained using a simplified global motion model is also of mediocre quality.

Thus, an embodiment of the present invention aims to provide a method for estimating the global motion of the images which can be implemented in low cost price and low computing power devices while being reliable and efficient.

To that end, a first principle of an embodiment of the present invention is to provide a measurement of local motions at points located in a determined region of the image, and then to estimate the global motion based on a correlation between the measurements of local motions and a global motion model. The global motion estimated can then be used during an additional processing step, such as a step of stabilizing the images of a video sequence for example, or be used for any other application, such as video flow compression techniques for example.

Another principle of an embodiment of the present invention is to take a measurement of local motions on the edges of the image, for reasons described below.

Yet another principle of an embodiment of the present invention is to provide a hybrid imager comprising a central region dedicated to capturing images and a peripheral region equipped with motion sensors.

Thus, an embodiment of the present invention provides a method for capturing video images by means of an imager, including an estimation of the parameters of a model of global motion between successive images, the method comprising a measurement of local motions on edges of the images, the estimation of the parameters of the global motion model being performed using the result of the measurement of local motions on the edges of the images.

According to one embodiment, the method comprises a step of calculating local motions using the estimated parameters of the global motion model, and a comparison of the local motions calculated and the local motions measured on the edges of the image, to determine whether the estimated parameters of the global motion model at least partially coincide with the local motions measured.

According to one embodiment, the measurement of local motions is taken on four edges of the image.

According to one embodiment, the measurement of local motions on the edges of the images is taken according to a single motion detection axis parallel to the edges of the images, and according to two directions of displacement along the detection axis.

According to one embodiment, the method comprises providing and using an imager comprising: a central region for capturing images comprising light-sensitive cells, and a peripheral region equipped with motion sensors, supplying local motion data.

According to one embodiment, the peripheral region completely surrounds the central region.

According to one embodiment, the peripheral region comprises groups of motion sensors each comprising a single row of motion sensors.

According to one embodiment, the peripheral region comprises unidirectional motion sensors having a single motion detection axis and two displacement detection directions along the detection axis.

According to one embodiment, the acquisition of the images is performed in progressive mode, and the acquisition of the local motion data associated with an image is also performed in progressive mode and extends in a time window delimited by a first instant corresponding substantially to the start of the capture of a previous image and a second instant corresponding substantially to the end of the capture of the image.

According to one embodiment, the method comprises: capturing a first and a second image, measuring local motions at points of a first set of image points, during an acquisition period extending between the capture of the first image and the capture of the second image, calculating presumed positions of the image points in the initial set on the second image according to their positions on the first image, using the local motions measured on the edges of the image, to obtain a second set of image points, calculating initial parameters of the global motion model using the second set of image points, calculating theoretical positions of the image points in the initial set on the second image according to their positions on the first image, using the initial parameters of the global motion model, to obtain a third set of image points, comparing the second and third sets of image points, and removing, from the first set of image points, image points in error having a deviation greater than a first threshold between their positions in the second set and their positions in the third set, if the number of image points in error is above a second threshold.

According to one embodiment, the method comprises calculating new parameters of the global motion model, after removing image points in error from the first set of image points.

According to one embodiment, the global motion is estimated in relation with a global motion model comprising an angle of rotation, a zoom factor, and two parameters of translation according to orthogonal axes.

According to one embodiment, the method comprises a step of stabilizing the video images conducted using the estimated parameters of the global motion model.

An embodiment of the present invention also relates to a video imager comprising a first region equipped with light-sensitive cells for capturing images, and a second region on the edge of the first region, equipped with motion sensors enabling local motions to be measured on the edges of the images simultaneously with the capture of the images, the imager supplying local motion data in addition to video data proceeding from the light-sensitive cells.

According to one embodiment, the imager comprises circuits for collecting local motion data supplied by the motion sensors, and for supplying a temporal series of local motion data.

According to one embodiment, the imager comprises circuits for image acquisition in progressive mode, and circuits for local motion data acquisition in progressive mode, the acquisition of the local motion data associated with an image extending in a time window delimited by a first instant corresponding substantially to the start of the capture of a previous image and a second instant corresponding substantially to the end of the capture of the image.

According to one embodiment, the second region surrounds the first region.

According to one embodiment, the second region comprises groups of motion sensors each comprising a single row of sensors.

According to one embodiment, the second region comprises unidirectional motion sensors having one motion detection axis and two motion detection directions along the detection axis.

According to one embodiment, each motion sensor comprises at least two photoreceptors supplying electric signals varying according to a light intensity received, a correlation circuit for producing at least one local motion signal according to the electric signals, and an integrator circuit for supplying a mean value of the local motion signal, cyclically receiving a reset signal.

An embodiment of the present invention also relates to a video image acquisition device, comprising an imager and a calculating device programmed to estimate parameters of a model of global motion between successive images supplied by the imager, using the result of a measurement of local motions on edges of the images taken by the imager.

According to one embodiment, the calculating device is programmed to execute the following operations, so as to estimate the global motion between a first and a second image: from an initial set of image points on the first image, calculating the presumed positions of the image points on the second image according to their positions on the first image, using the local motions measured by the imager, to obtain a second set of image points, calculating initial parameters of the global motion model using the second set of image points, calculating theoretical positions of the image points in the initial set on the second image according to their positions on the first image, using the initial parameters of the global motion model, to obtain a third set of image points, comparing the second and third sets of image points, and removing, from the first set of image points, image points in error having a deviation greater than a first threshold between their positions in the second set and their positions in the third set, if the number of image points in error is above a second threshold.

According to one embodiment, the calculating device is programmed for calculating new parameters of the global motion model, after image points in error have been removed from the first set of image points.

According to one embodiment, the calculating device is programmed to estimate the global motion in relation with a global motion model comprising an angle of rotation, a zoom factor, and two parameters of translation according to orthogonal axes.

According to one embodiment, the calculating device is programmed to stabilize video images using the estimated parameters of the global motion model.

In one embodiment, a method for capturing video images by means of an imager comprises measuring local motions on edges of the images; and estimating parameters of a global motion model using results of the measurement of local motions on the edges of the images. In one embodiment, the method further comprises calculating local motions using the estimated parameters of the global motion model; comparing the local motions calculated and the local motions measured on the edges of the image; and determining whether the estimated parameters of the global motion model at least partially coincide with the local motions measured. In one embodiment, the measurement of local motions is taken on four edges of the image. In one embodiment, the measurement of local motions on the edges of the images is taken according to a single motion detection axis parallel to the edges of the images, and according to two directions of displacement along the detection axis.

In one embodiment, a method employs an imager comprising a central region for capturing images comprising light-sensitive cells; and a peripheral region equipped with motion sensors, supplying local motion data. In one embodiment, the peripheral region completely surrounds the central region. In one embodiment, the peripheral region comprises groups of motion sensors each comprising a single row of motion sensors. In one embodiment, the peripheral region comprises unidirectional motion sensors having a single motion detection axis and two displacement detection directions along the motion detection axis. In one embodiment, the capturing of the images is performed in progressive mode, and acquisition of local motion data associated with an image is performed in progressive mode and extends in a time window delimited by a first instant corresponding substantially to a start of the capture of a previous image and a second instant corresponding substantially to an end of the capture of the image.

In one embodiment, the method comprises capturing a first and a second image, wherein measuring local motions comprises measuring local motions at points of a first set of image points, during an acquisition period extending between the capture of the first image and the capture of the second image; and estimating parameters of a global motion model comprises: calculating presumed positions of the image points in the first set of image points on the second image according to their positions on the first image, using the local motions measured on the edges of the image, to obtain a second set of image points; calculating initial parameters of the global motion model using the second set of image points; calculating theoretical positions of the image points in the first set on the second image according to their positions on the first image, using the initial parameters of the global motion model, to obtain a third set of image points; comparing the second and third sets of image points; and removing, from the first set of image points, image points having a deviation greater than a first threshold between their positions in the second set of image points and their positions in the third set of image points, if the number of image points to be removed is above a second threshold. In one embodiment, the method comprises calculating new parameters of the global motion model, after removing image points from the first set of image points. In one embodiment, the parameters of the global motion model comprise an angle of rotation, a zoom factor, and two parameters of translation according to orthogonal axes. In one embodiment, the method comprises stabilizing the video images conducted using the estimated parameters of the global motion model. In one embodiment, the method comprises compensating for local motions attributable to an animated object entering the images.

In one embodiment, a video imager comprises a first region equipped with light-sensitive cells for capturing images; and a second region on an edge of the first region, equipped with motion sensors enabling local motions to be measured on the edges of the images simultaneously with the capture of the images, wherein the video imager is configured to supply local motion data in addition to video data proceeding from the light-sensitive cells. In one embodiment, the imager comprises circuits for collecting local motion data supplied by the motion sensors, and for supplying a temporal series of local motion data. In one embodiment, the first region comprises circuits for image acquisition in progressive mode, and the second region comprises circuits for local motion data acquisition in progressive mode, the acquisition of the local motion data associated with a current image extending in a time window delimited by a first instant corresponding substantially to a start of the capture of a previous image and a second instant corresponding substantially to an end of the capture of the current image. In one embodiment, the second region surrounds the first region. In one embodiment, the second region comprises groups of motion sensors each comprising a single row of sensors. In one embodiment, the second region comprises unidirectional motion sensors having one motion detection axis and two motion detection directions along the detection axis. In one embodiment, each motion sensor comprises: at least two photoreceptors supplying electric signals varying according to a light intensity received, a correlation circuit for producing at least one local motion signal according to the electric signals, and an integrator circuit for supplying a mean value of the local motion signal, cyclically receiving a reset signal.

In one embodiment, a video image acquisition device comprises an imager having: a first region equipped with light-sensitive cells for capturing images; and a second region on an edge of the first region, equipped with motion sensors enabling local motions to be measured on the edges of the images simultaneously with the capture of the images, wherein the video imager is configured to supply local motion data in addition to video data; and a calculating device programmed to estimate parameters of a model of global motion between successive images supplied by the imager, using a result of a measurement of local motions on edges of the images taken by the imager. In one embodiment, the calculating device is configured to estimate the parameters of the global motion between a first and a second image by: from an initial set of image points on the first image, calculate presumed positions of the image points on the second image according to their positions on the first image, using the local motions measured by the imager, to obtain a second set of image points; calculate initial parameters of the global motion model using the second set of image points; calculate theoretical positions of the image points in the initial set on the second image according to their positions on the first image, using the initial parameters of the global motion model, to obtain a third set of image points; compare the second and third sets of image points; and selectively remove from the first set of image points, image points having a deviation greater than a first threshold between their positions in the second set and their positions in the third set, when the number of image points having the deviation greater than the first threshold is above a second threshold. In one embodiment, the calculating device is configured to calculate new parameters of the global motion model, after image points having the deviation greater than the first threshold have been removed from the first set of image points. In one embodiment, the parameters of the global motion model comprise an angle of rotation, a zoom factor, and two parameters of translation according to orthogonal axes. In one embodiment, the calculating device is configured to stabilize video images using the estimated parameters of the global motion model.

In one embodiment, a video imager comprises means for capturing a first video image and a second video image; and means for measuring local motions associated with a portion of the captured video images. In one embodiment, the means for capturing the first and second video images comprises a first plurality of light-sensitive cells; and the means for measuring local motions comprises a second plurality of cells, each cell in the second plurality of cells comprising a plurality of photoreceptors and means for providing an indication of a displacement speed of an image point. In one embodiment, the second plurality of cells surrounds the first plurality of cells. In one embodiment, the means for providing the indication of the displacement speed comprises: a first edge detector coupled to a first one of the plurality of photoreceptors; a first pulse shaper coupled to the first edge detector; a second edge detector coupled to a second one of the plurality of photoreceptors; and a second pulse shaper coupled to the second edge detector.

In one embodiment, a computer-readable memory medium containing instructions for causing an imaging device to process video images by generating control signals to cause the imaging device to: measure local motions on edges of the images; and estimate parameters of a global motion model using results of the measurement of local motions on the edges of the images. In one embodiment, the instructions further cause the imaging device to: capture a first and a second image, wherein measuring local motions comprises measuring local motions at points of a first set of image points during an acquisition period extending between the capture of the first image and the capture of the second image; and estimating parameters of a global motion model comprises: calculating a second set of image points using the local motions measured on the edges of the image; calculating initial parameters of the global motion model using the second set of image points; calculating using the initial parameters of the global motion model; comparing the second and third sets of image points; and modifying the initial parameters of the global motion model based on the comparison of the second and third sets of image points.

BRIEF DESCRIPTION OF THE SEVERAL VIEWS OF THE DRAWINGS

These and other objects, features and advantages of embodiments of the present invention will be explained in greater detail in the following description of the methods of the present disclosure and of an example of an embodiment of an imager according to the present invention, given in relation with, but not limited to, the following figures:

FIGS. 4 and 5 represent examples of local motion vectors corresponding respectively to a rotary motion of the imager and to a zoom action on the scene filmed;

FIGS. 6 and 7 schematically represent two examples of embodiments of an imager according to the present invention;

DETAILED DESCRIPTION OF THE INVENTION

Figure 1:
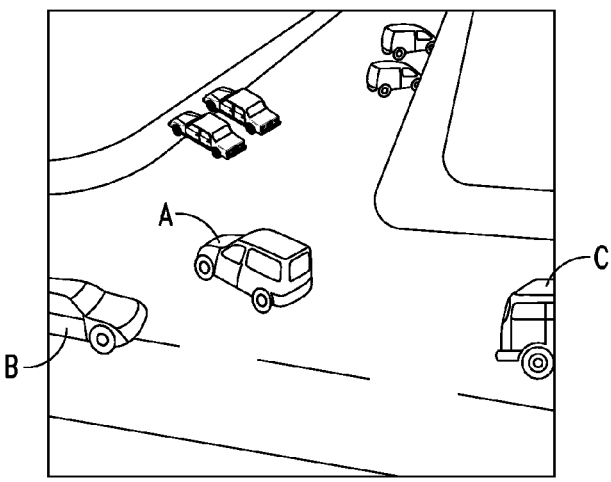
FIG. 1 represents an image extracted from a video sequence taken by means of a classical imager and representing any ordinary scene.
Figure 2:
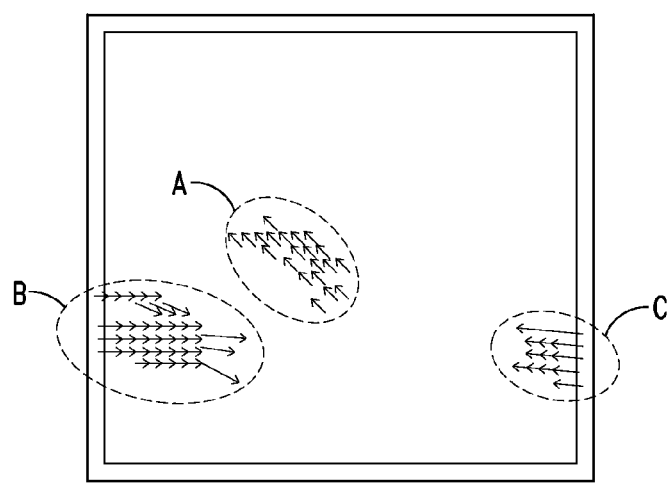
FIG. 2 represents local motion vectors associated with the image, in the event that the scene contains objects in motion and that the imager is motionless.
Figure 3:
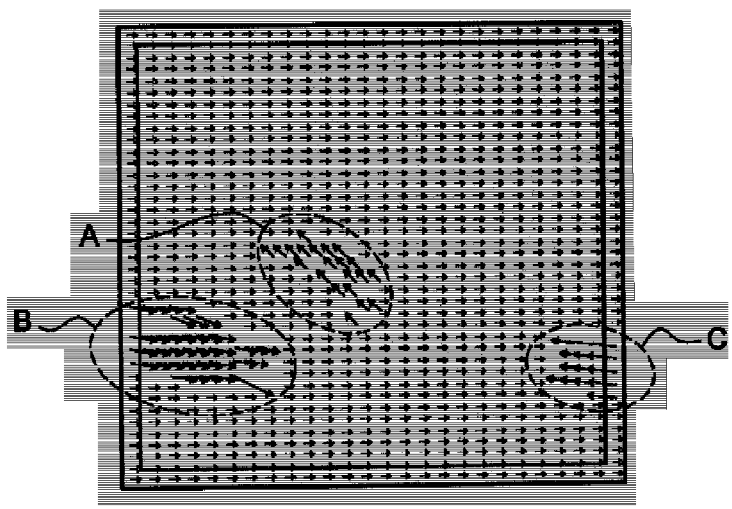
FIG. 3 represents local motion vectors associated with the image, in the event that the scene contains objects in motion and that the imager is in motion.

When observing the images of a video sequence, it can generally be seen that the edges of the image represent for the most part the fixed background of the scene filmed. For a better understanding, FIG. 1 represents an image in a video sequence representing a scene (here a crossroads) in which there are objects in motion A, B, C (here vehicles) and motionless objects (here parked vehicles). FIGS. 2 and 3 represent, in the form of vectors, the local motions that will modify this image to form the very next image (not represented). FIG. 2 shows the case in which the imager used to capture the video sequence is fixed and FIG. 3 shows the case in which the imager undergoes a motion corresponding to a translation motion from left to right of the image projected onto the imager. In FIG. 2, groups of local motion vectors can be distinguished at the places where the objects in motion A, B, C are located. In the rest of the image, the local motion vectors are zero. However, in FIG. 3, a set of local motion vectors can be distinguished that are homogeneously distributed over the entire image, oriented in the same direction and corresponding to the global motion of the imager in relation to the scene filmed, as well as groups of isolated local motion vectors located at the places of the objects in motion A, B, C.

On each of the figures, the peripheral region of the image corresponding to the edges of the image (marked by two solid lines forming a sort of frame) and the local motion vectors present in this region will now be observed. In FIG. 2, it can be seen that only the local motion vectors corresponding to the object C (which is coming into the shooting field) are not zero, the objects A and B being in the central portion of the image. If the vector mean value of all of the local motion vectors present in the peripheral region is calculated, the resulting vector is an almost zero vector since the mean value is calculated over a set of vectors mostly comprising zero vectors except for the local motion vectors corresponding to the object C, which are in the minority. However, in FIG. 3, it can be seen that the edge of the image has a large number of local motion vectors of the same direction, corresponding to the motion of the imager in relation to the scene filmed, as well as a few isolated motion vectors due to the motions of the object C. Thus, the calculation of the vector mean value of all of the local motion vectors here gives a vector substantially equal to each of the local motion vectors linked to the motion of the imager, the vectors linked to the motion of the object C being in the minority and having little influence on the result.

Thus, the local motions the furthest removed from the centre of the image are the most representative of the global motion of the image. Furthermore, in most cases, the animated objects are generally located in the central region of the image, except for those coming into the image.

As another example, FIG. 4 represents a set of local motion vectors caused by a rotary motion of the imager about its optical axis. Once again, it can be seen that the local motion vectors the most representative of the global motion of the imager are located on the edges of the image, where they have the greatest amplitude.

A last example is shown in FIG. 5, which represents a set of local motion vectors corresponding to a zoom action (moving closer to the scene). It can be seen that the local motion vectors the most representative of the global motion of the imager in relation to the scene, are located on the edges of the image where they have the greatest amplitude.

It emerges from these various examples and observations that the region on the edge of an image is a preferred area for determining the global motion between two successive images. It also emerges that by detecting local motions on the edges of an image, it is possible to remove a considerable amount of "spurious" local motions (in relation to the global motion) which are in the central region of the scene filmed.

Thus, an embodiment of the present invention suggests detecting local motions on the edges of an image to obtain an estimation of the global motion. Two example embodiments of the present invention illustrating two methods enabling the global motion to be estimated are described below.

The first example method comprises a measurement of local motions on the edges of the image, performed during post-processing and using the image points supplied by the imager, followed by an estimation of the global motion using the measurements of local motions. As the measurement of the local motions concerns a limited number of image points, it requires a lower computing power than the classical methods concerning the entire image, with a similar quality of estimation. This example method can be implemented by those skilled in the art by applying the classical techniques for detecting local motions within an image, the difference being that these techniques are here applied to a small set of image points corresponding to the edges of the image.

The second example method comprises measurements of local motions on the edges of the image taken by hardware by means of motion sensors integrated into an imager, such that the post-processing step then comprises a step of estimating the global motion using the measurements of local motions. As the estimation of the global motion is performed using measurements of local motion, and only concerns a limited number of points, the calculation steps resulting in an estimation of the global motion are then considerably simplified in relation to previous practices, with a similar quality of estimation.

Below, the implementation of the second example method will be described, together with means for implementing the second example method.

A pixel or image point designates a monochromatic element of an image, generally coded by a piece of luminance information, a piece of chrominance information and possibly a piece of information concerning its position on the image if this position cannot be deduced from the position of the pixel in a video frame. A pixel is generally red, green or blue (subtractive synthesis pixels also being used). Furthermore, a light-sensitive cell or "photosite" of an imager is an elementary image sensor corresponding to a pixel, supplying the luminance information of the pixel and covered by a primary color filter the color of which determines the chrominance information associated with the luminance information of the pixel. In CMOS technology, a light-sensitive cell is generally produced in the form of an APS (Active-Pixel Sensor) comprising signal amplifier transistors in addition to a photoreceptor, and having the added advantage of being individually accessible.

To take a measurement of local motions on the edges of an image simultaneously with an acquisition of the image, an embodiment of the present invention provides a "hybrid" imager comprising a central region equipped with light-sensitive cells and a peripheral region equipped with motion sensors.

Motion sensors are used in industry, particularly in robotics and industrial applications. They differ from the light-sensitive cells of video imagers in that they comprise a circuit that is configured to analyze the electric signal sent by photoreceptors to supply a piece of information about the displacement speed of image points rather than a piece of information concerning the image points themselves (particularly luminance and chrominance). A motion sensor thus generally comprises at least two photoreceptors (photodiodes, light-sensitive MOS capacitors, etc.) defining a motion image point (i.e., not detected as such, in terms of luminance and chrominance) and a related electronic circuit that processes the information supplied by the photoreceptors to deduce a piece of information about the displacement speed of the motion image point therefrom. Such a piece of "speed" information corresponds to a piece of motion information, its conversion into a distance being proportional to the time elapsed between two measurements. References of various documents describing methods of manufacturing motion sensors are given in Appendices 1, 2 and 3. So-called "differential" methods, "mapping", and "correlation", or "frequential" methods are distinguished.

Mapping methods are based on a temporal mapping of a temporal characteristic element, such as a rapid variation in light on a photoreceptor for example, which is identified on a neighboring photoreceptor. They can also be based on a temporal mapping of a spatial characteristic element, such as a contrast detected on a photoreceptor for example, which is identified an instant later on a neighboring photoreceptor.

A mapping method is used below to produce the motion sensors integrated into the imager according to an embodiment of the present invention, but is only an example of an embodiment of the present invention.

FIG. 6 schematically represents a hybrid imager 1 according to the present invention. The imager comprises a central region 2 and a peripheral region 3. The central region is rectangular and is formed by an image matrix 2 comprising light-sensitive cells Cm,n arranged in lines and in columns, "m" being a line index and "n" a column index of the cells. The peripheral region 3 comprises motion sensors MSj schematically represented in a small amount in the Figure. The peripheral region 3 surrounds the image matrix 2 and comprises a first group G1 of sensors that is parallel to the top edge of the matrix, a second group G2 of sensors parallel to the bottom edge of the matrix, a third group G3 of sensors parallel to the right-hand vertical edge of the matrix, and a fourth group G4 of sensors parallel to the left-hand vertical edge of the matrix. Each group of sensors comprises a single row of sensors, but could comprise several rows, particularly for applications requiring a very precise estimation of the global motion or if the size of the matrix is too small to have a sufficient number of motion sensors along its edges.

The motion sensors MSj represented in FIG. 6 are "2D" sensors, i.e., having two detection axes. For each motion sensor, one detection axis is parallel to the edge of the image matrix 2 along which the sensor is located and the other detection axis is perpendicular to this edge. In other embodiments, the motion sensors MSj could employ additional or different detection axes.

It can however be observed that the spurious local motions (for example an animated object entering the scene filmed) generally occur according to an axis substantially perpendicular to the edges of the image (Cf. FIGS. 2 and 3, object B) and thus show motion vectors perpendicular to the edges of the image. In these conditions, a measurement of the local motions taken according to an axis parallel to the edge of the image can enable the influence of the local motions on the estimation of the global motion to be reduced even further.

FIG. 7 shows an imager 1' in which the measurement of the local motions is taken according to axes parallel to the edge of the image. The imager 1' thus differs from the previous one in that the groups G1 to G4 of motion sensors comprise motion sensors MSj of "1D" type, i.e., having only one motion detection axis. For each sensor, the motion detection axis is parallel to the edge of the image matrix 2 along which the sensor is located, such that the transversal local motions are not detected. The simplicity of this embodiment is also advantageous, as 1D motion sensors comprise less complex measurement circuits than 2D motion sensors and occupy less silicon surface area.

Figure 8:
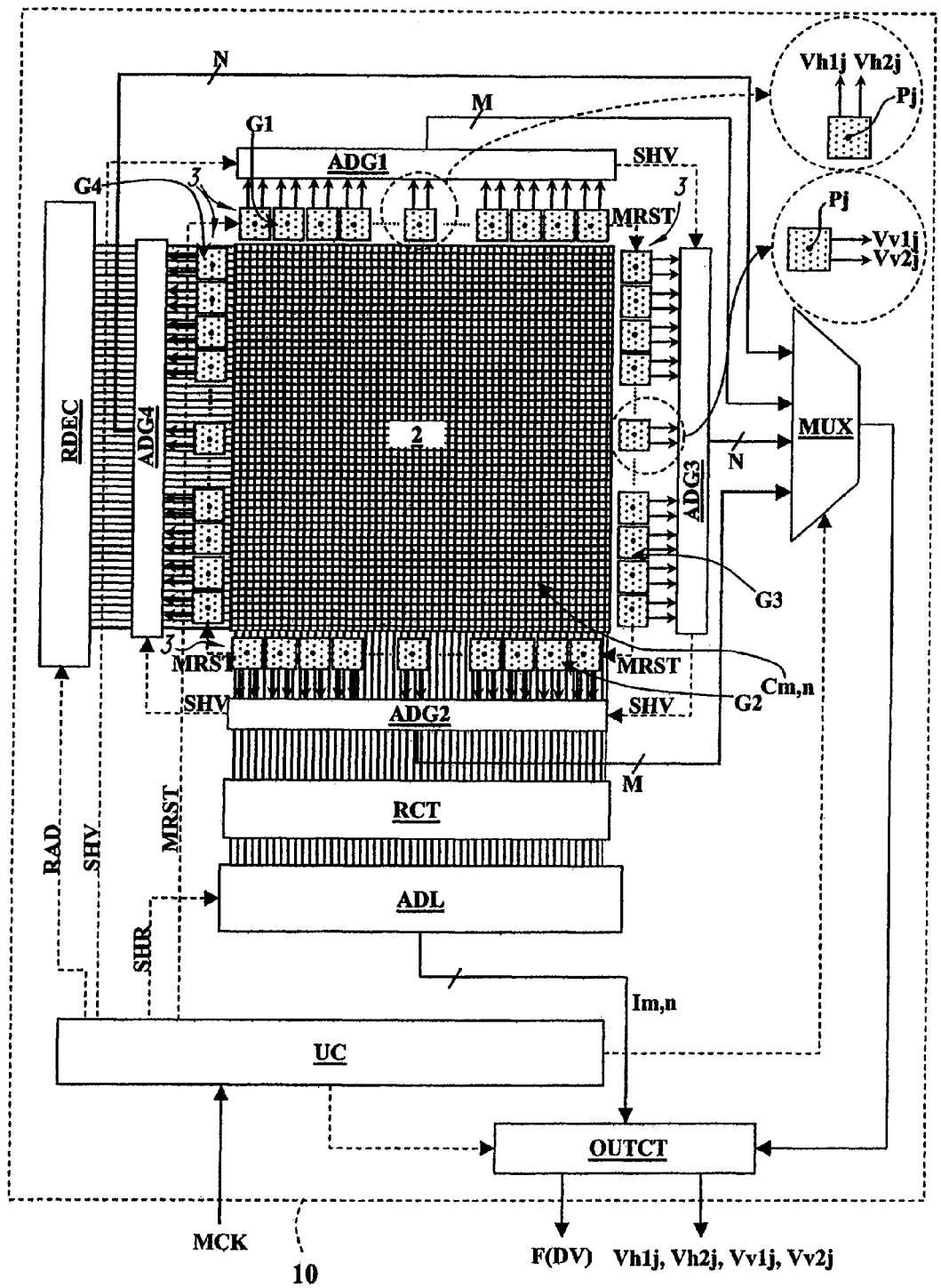
FIG. 8 represents in greater detail an embodiment of the imager in FIG. 7.

FIG. 8 represents in greater detail the general architecture of a hybrid imager 10 conforming to the embodiment in FIG. 7, i.e., using "1D" motion sensors. The imager 10 may be, for example, produced on a silicon chip using CMOS technology. The central region occupied by the image matrix 2 and the groups G1 to G4 of motion sensors MSj arranged in the peripheral region 3, along the edges of the image matrix 2 are found again.

The structure of the image matrix 2, which may be classical, is schematically represented on the Figure and will not be described in detail. Such a matrix of light-sensitive cells is used in CMOS imagers available in shops and its structure is well known to those skilled in the art. Horizontal lines link the cells of the matrix to a line decoder RDEC and vertical lines link the cells to a read circuit RCT. A mosaic of red, green and blue filters (not represented) distributed for example according to the Bayer architecture, is arranged on the matrix. Each light-sensitive cell is thus covered with a red, green or blue primary color filter to supply a piece of luminance information about the primary color allocated to it, forming a piece of pixel information. The matrix is of the VGA type for example and comprises approximately 640 lines and 480 columns of light-sensitive cells, the cells of a line being alternately red and green, or alternately green and blue (for a Bayer distribution).

The circuit RCT is for example a low-noise read circuit of CDS ("Correlated double sampling") type, and comprises parallel outputs linked to corresponding inputs of an analog-to-digital converter ADL. The converter ADL integrates a multiplexing function and comprises a digital output which supplies the digitized value of one of the analog inputs, and which is linked to the input of a video output circuit OUTCT. These various elements are controlled by a central processing unit UC that receives a master clock signal MCK to pace the scanning of the lines of the matrix. During the period separating two images, such as 20 ms for example for an acquisition of images at 50 Hz, the information supplied by the light-sensitive cells are read line by line. Upon each read of a line, the decoder RDEC receives a line address RAD supplied by the central processing unit UC and selects the corresponding line (a scan of the line addresses by means of an address counter integrated into the decoder RDEC can also be provided). When a line is selected, the read circuit RCT simultaneously reads all of the pixels in the line and supplies pixel luminance signals to the parallel inputs of the converter ADL. The converter ADL converts these signals into digital data Im,n each representing the luminance of a pixel, and supplies these data to the circuit OUTCT one after the other, at the pace of a sampling and multiplexing signal SHR supplied by the central processing unit. The circuit OUTCT juxtaposes the luminance and chrominance data of the pixels (each datum Im,n being associated with a pixel primary color) to form structured video data DV comprising indications about the luminance and chrominance of the image pixels. The circuit OUTCT supplies these data to the external environment by applying a determined digital image transfer and encoding protocol, consisting for example of video frames F(DV) which incorporate the video data DV. The reconstitution of a polychromatic image using pixel information is generally performed during post-processing, by a processor of the type described below which receives the video frame.

An embodiment of a motion detection portion that is integrated into the imager 10 and which distinguishes it from a classical imager will now be described. The groups G1, G2 each comprise N motion sensors MSj and the groups G3, G4 each comprise M motion sensors MSj. By allocating a continuing value over the four groups to the index "j", the motion sensors are referenced $MS_1$ to $MS_N$ (group G1), $MS_{N+1}$ to $MS_{2N}$ (group G2), $MS_{2N+1}$ to $MS_{2N+M}$ (group G3) and $MS_{2N+M+1}$ to $MS_{2N+2M}$ (group G4). Each sensor comprises photoreceptors and motion measurement circuits, and typically occupies a surface area of silicon that is greater than that of a light-sensitive cell. As a result, the number of motion sensors in the groups G1 and G2 is lower than the number of columns in the matrix and the number M of motion sensors in the groups G3 and G4 is lower than the number of lines in the matrix. For example, N is equal to 80 and M equal to 60. If it is desirable to provide a greater number of motion sensors on the edge of the image matrix 2, the motion measurement circuits can be implanted outside the peripheral region 3, so as to reduce the pitch between the sensors.

Figure 9:
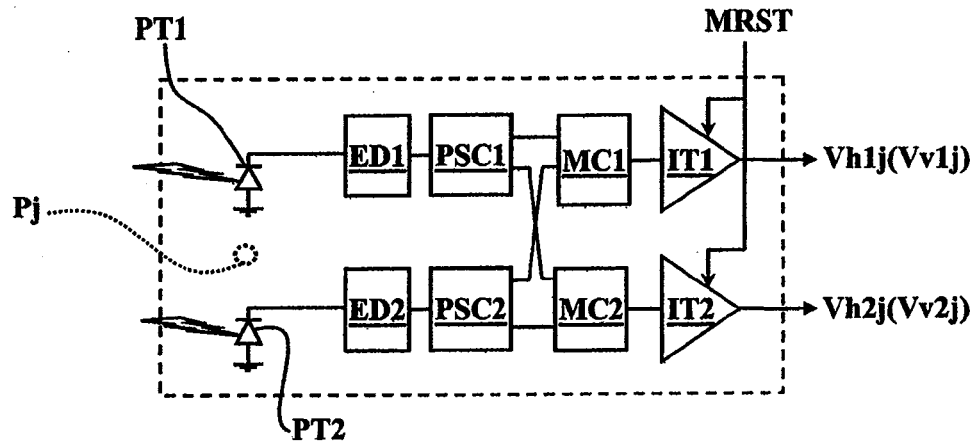
FIG. 9 represents an example of an embodiment of a motion sensor represented in block form in FIG. 8.

An example of the structure of a motion sensor MSj is represented in FIG. 9. The sensor MSj comprises two photoreceptors PT1, PT2, here photodiodes, and two measuring chains each linked to a photoreceptor. Each measuring chain comprises an edge detector ED1, ED2 linked to one of the photoreceptors PT1 PT2, the output of which supplies pulses of current. The pulses of current are applied to the input of a pulse shaping circuit PSC1, PSC2. The output of each circuit PSC1, PSC2 supplies pulses of voltage and is linked to an input of a circuit MC1, MC2 ("Motion Circuit") for detecting motion according to the mapping principle. Thus, each motion circuit MC1, MC2 comprises two inputs and receives the pulses proceeding from the edge detectors ED1, ED2 and shaped by the circuits PSC1, PSC2. The circuit MC1 supplies a signal about the speed of displacement of an image point according to a detection axis passing via the two photoreceptors PT1, PT2 and according to a first displacement direction, while the circuit MC2 supplies a signal about the speed of displacement of a image point according to the same detection axis but according to a second displacement direction opposite the first. The signal supplied by each circuit MC1, MC2 is applied to an integrator IT1, IT2 which supplies a mean value of the displacement speed signal, i.e., a mean displacement speed signal. The integrators IT1, IT2 are cyclically reset by a signal MRST supplied by the central processing unit UC (Cf. FIG. 8).

By using the bottom, the top, the left and the right of FIG. 8 as points of reference, the signals supplied by the integrators have the following characteristics:

if the motion sensor MSj belongs to one of the groups G1, G2, the integrator IT1 supplies a mean speed signal Vh1j corresponding to a horizontal displacement from left to right, and the integrator IT2 supplies a mean speed signal Vh2j corresponding to a horizontal displacement from right to left, if the motion sensor MSj belongs to one of the groups G3, G4, the integrator IT1 supplies a mean speed signal Vv1j corresponding to a vertical displacement from bottom to top, and the integrator IT2 supplies a mean speed signal Vv2j corresponding to a vertical displacement from top to bottom.

In summary, and as represented in FIG. 8 in circles in dotted lines, the sensors MSj of the groups G1, G2 each supply two complementary signals Vh1j, Vh2j providing an indication about the mean speed of horizontal displacement of a motion image point "P" located for example equidistant from the photoreceptors PT1, PT2 (Cf. FIG. 9 also). Similarly, the sensors MSj of the groups G3, G4 each supply two complementary signals Vv1j, Vv2j providing an indication about the mean speed of vertical displacement of a motion image point located for example equidistant from the two photoreceptors.

The signals Vh1j, Vh2j supplied by the sensors of the group G1 are applied in parallel to an analog-to-digital converter ADG1 and those supplied by the sensors of the group G2 are applied in parallel to an analog-to-digital converter ADG2. Similarly, the signals Vv1j, Vv2j supplied by the sensors of the group G3 are applied in parallel to an analog-to-digital converter ADG3 and the signals Vv1j, Vv2j supplied by the sensors of the group G4 are applied in parallel to an analog-to-digital converter ADG4. Upon each image acquisition cycle, the central processing unit UC applies to the converters ADG1 to ADG4 a sampling signal SHV and then applies to the motion sensors MSj the reset signal MRST, which marks the start of a new acquisition cycle of a displacement speed measurement. Upon receiving the signal SHV, the converters ADG1 to ADG4 then supply at their outputs, in parallel, local motion digital data Vh1j, Vh2j or Vv1j, Vv2j corresponding to the analog mean speed signals (for the sake of simplicity, the same notation is used to designate the digital local motion data and the analog signals from which they proceed). These data are applied in parallel to a multiplexer MUX which is also controlled by the central processing unit UC, which sends them one after the other to the circuit OUTCT. This circuit comprises, in addition to the output that supplies the video frame F(DV), a distinct output that supplies the local motion data Vh1j, Vh2j or Vv1j, Vv2j to the external environment.

The sampling signal SHV that triggers the capture of the local motion data and the reset signal MRST that marks the start of a new acquisition cycle of the local motion data, are supplied by the central processing unit UC in synchronization with the frequency of reading the images supplied by the image matrix 2, which is read in progressive mode as a result of the scan of the lines of light-sensitive cells.

Thus, an acquisition of a set of data of horizontal local motions Vh1j, Vh2j (with j ranging from 1 to 2N) and vertical local motions Vv1j, Vv2j (with j ranging from 2N+1 to 2M) detected on the horizontal and vertical edges of the image by the motion sensors is associated with each acquisition of a complete image.

It will be understood by those skilled in the art that various alternative embodiments of this embodiment of a hybrid sensor according to the present invention are possible.

Thus, in one alternative embodiment, the acquisition of the local motion data is performed in progressive mode (sequentially) instead of being performed in simultaneous mode. In this case, the central processing unit UC applies to the motion sensors sampling SHV and reset MRST signals that are individual and specific to each motion sensor. The local motion data are read in synchronization with the progressive reading of the lines of the matrix. Assuming for example that the vertical groups G3, G4 comprise motion sensors that each occupy vertically the equivalent of 10 lines of the image matrix (their size being greater than that of the light-sensitive cells), then the signals supplied by these sensors can be read (i.e., sampled and digitized) in pairs every time 10 lines are read in the matrix. In this case, every 10 lines, the central processing unit UC first of all reads the information supplied by the sensor of the group G4 which is located to the left of the line, then reads the light-sensitive cells of the line, then reads the information supplied by the sensor of the group G3 which is located to the right of the line. The signals supplied by the motion sensors of the groups G1, G2 can continue to be read in simultaneous mode, once per image acquisition cycle, but they can also be read in progressive mode by respecting the sequence of progressive reading of the image. For example, the central processing unit reads the sensors of the group G1 one after the other before reading the first line of the image matrix, and reads the sensors of the group G2 one after the other after reading the last line of the image matrix (as well as the sensors of the groups G3, G4, which have been read during the reading of the image matrix).

Moreover, the local motion data Vh1j, Vh2j, Vv1j, Vv2j can be mixed with the video data DV by the circuit OUTCT, to be sent via the main output of this circuit.

Furthermore, although the production of a digital output imager facilitates the processing and transport of the information concerning the image and the local motions, the imager can also be equipped with an analog output supplying the image signal in classical analog form (composite, S-Video, RGB or YUV) and supplying the displacement speed information in the form of a series of analog voltages, or even in parallel.

The local motion data supplied by the imager are not necessarily mean values calculated by integrators, as suggested above. It can be any type of information relating to the local motions, coded or otherwise, such as the maximum displacement speed value detected during the acquisition period (i.e., between two resets of the measuring circuits of the sensors) for example. The local motion data supplied by each sensor and for each image can also comprise a series of local motion data sampled with a sampling frequency greater than the image acquisition frequency (in this case, each sensor supplies a set of data for each image captured). This series of data may also comprise combined information, such as the mean speed value detected, the maximum speed value detected, the minimum speed value detected, etc.

In addition, providing motion sensors over the entire perimeter of the image matrix is not an essential characteristic but rather a preferred characteristic of the present invention which increases the reliability of the detection of the global motion thanks to a good distribution of the detections of local motions over the entire perimeter of the image and a high rate of rejection of the spurious local motions caused by objects crossing the scene filmed.

Finally, the information supplied by the photoreceptors of the motion sensors, which are used here exclusively to detect contrast variations, can be simultaneously used as luminance information to associate image points with the points of measurement of the local motions. In this case, the density of displacement sensors may be greater (which implies shifting the implantation area of the motion measurement circuits beyond the rows of photoreceptors) along the image matrix and a primary color filter associated with each photoreceptor. The local motion measurement points are then entirely integrated into the video image.

Estimation of the Global Motion

Figure 10:
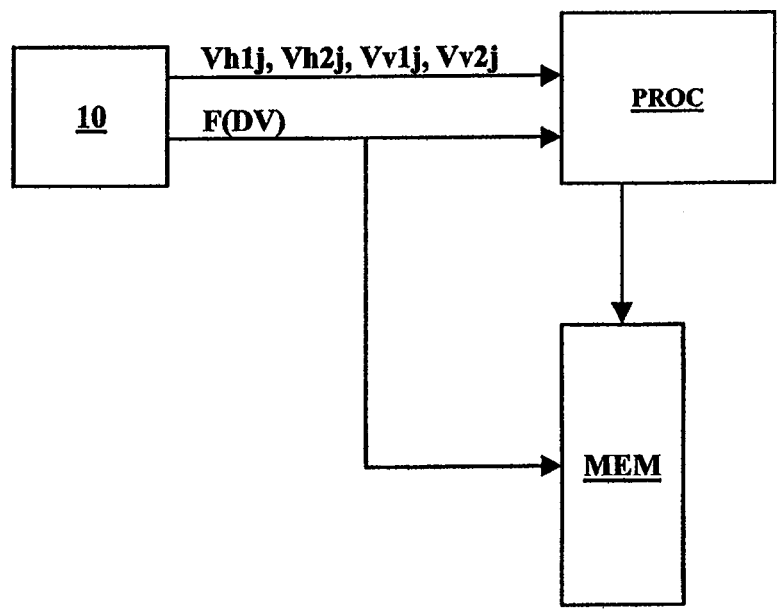
FIG. 10 is a block diagram of an embodiment of a video image acquisition device according to the present invention.

The estimation of the global motion between two successive images using the local motion data Vh1$j$, Vh2$j$, Vv1$j$, Vv2$j$ may be conducted in real time by an embodiment of a video image acquisition device represented in FIG. 10. The device comprises an imager 10 according to an embodiment of the present invention and a processor PROC receiving from the imager the video frame F(DV) as well as the local motion data Vh1$j$, Vh2$j$, Vv1$j$, Vv2$j$. As the computation load for the implementation of the method of the present invention is lower than with previous methods, the processor can be a simple microprocessor or a microcontroller. The processor PROC is linked to a memory array MEM comprising a program-memory in which a method is saved in program form that enables the processor to estimate the global motion between the successive images, using the local motion data Vh1$j$, Vh2$j$, Vv1$j$, Vv2$j$ associated with each image supplied. The memory space MEM may further comprise other memories, such as a buffer memory to store the video flow or to store the images processed by the processor and/or the global motion value estimated by the processor for each image relative to the previous image.

An embodiment of a method will now be described that enables the global motion between images to be estimated, by using the local motion data supplied by the imager.

The point here is to define a method enabling the global motion of a second image captured at an instant t+dt to be determined in relation to a first image preceding the second image, captured at an instant t, "dt" being the image capturing period. This example method is intended to be repeated for each new image supplied by the imager, the following image then becoming the previous image. To define the method, two pieces of information are available:

1) the positions of reference points in the first image (position at the instant t). These reference points correspond to the positions of the motion sensors in the plane of the imager.

2) the local motion data Vh1, Vh2 or Vv1, Vv2 supplied by the imager with the second image, which have been measured in the time interval dt (in simultaneous or progressive mode, see above) and enable the positions of the reference points in the second image at the instant t+dt to be determined.

Figure 11:
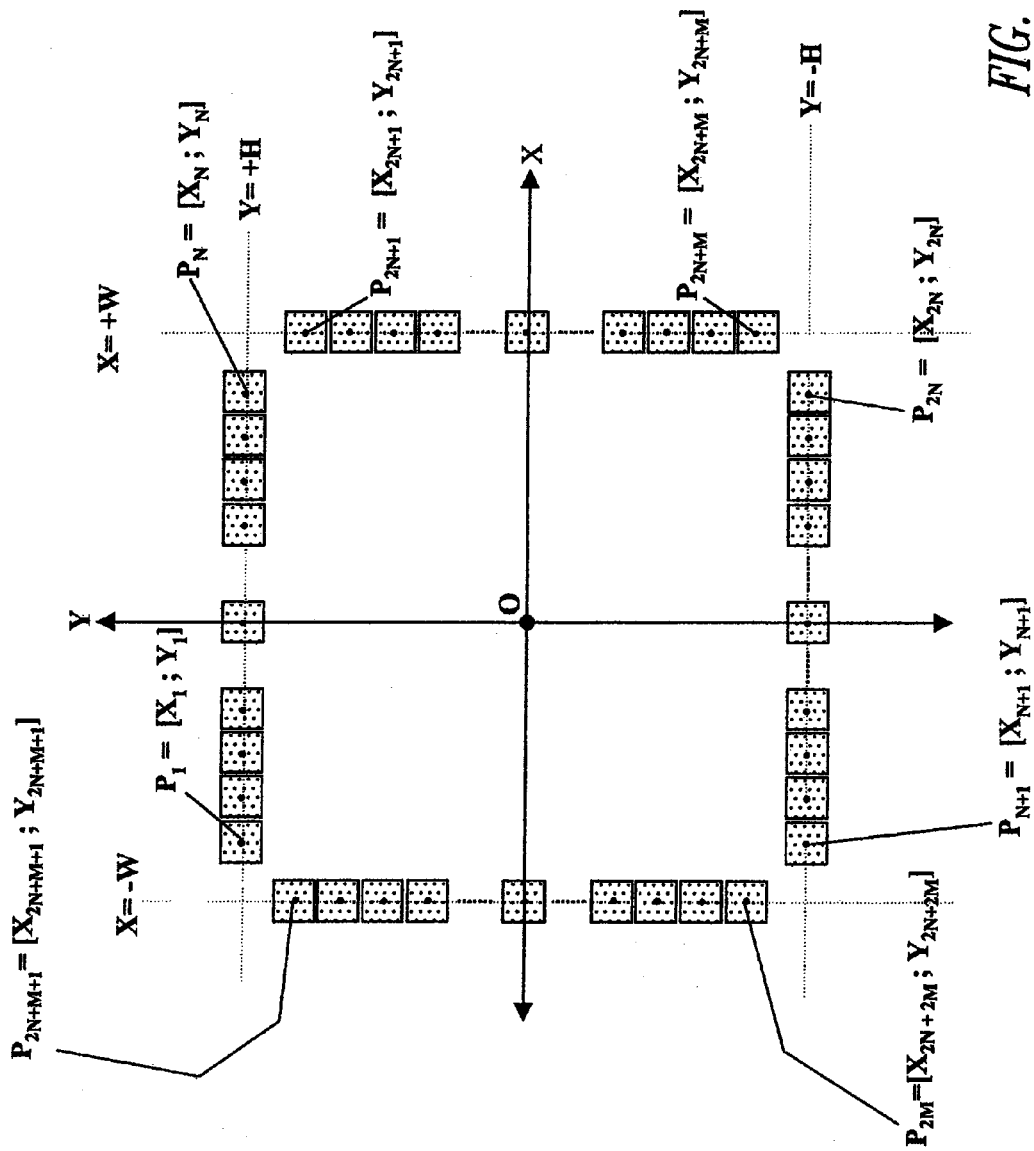
FIG. 11 is an example representation, in a plane, of the position of motion sensors present in the imager in FIG. 8, for the determination of the parameters of a global motion model.
Figure 12:
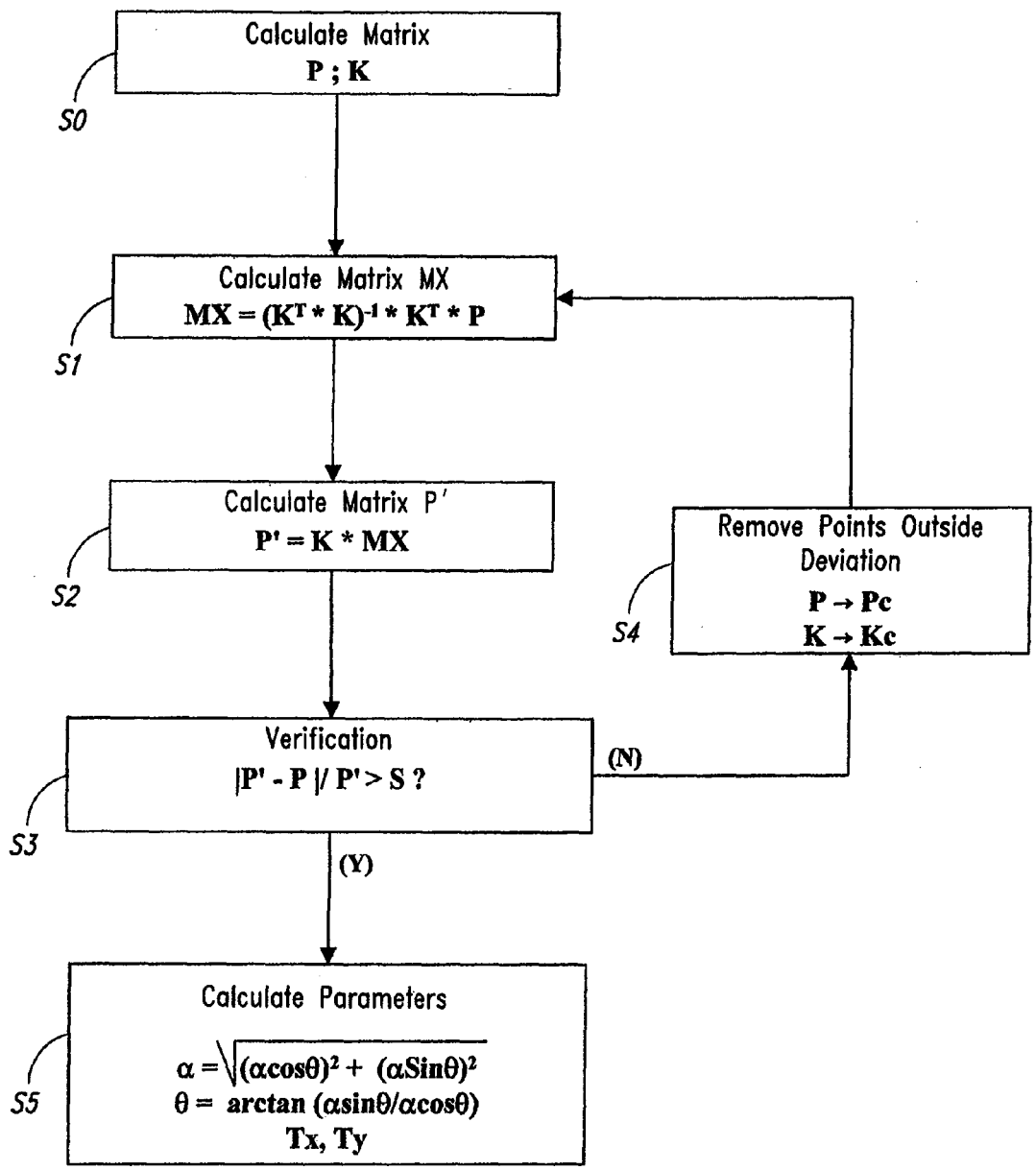
FIG. 12 is a flowchart describing an example of a method enabling the global motion to be estimated according to local motion measurements supplied by the imager in FIG. 8.

As shown in FIG. 11, a set of reference points or motion image points is defined in a plane of Cartesian coordinates defined by an orthonormal coordinate system of axes X and Y having the centre of the image as the centre O. As explained above, the motion image points may not be detected in terms of their luminance and chrominance characteristics and are not therefore visible in the image. However, these image points are considered to be part of the image since the local motions measured at these image points are representative of a global motion that concerns the entire image. Furthermore, as it was also explained above, these points can be incorporated into the image, by simultaneously providing a detection of a piece of luminance information and by associating this luminance information with a piece of chrominance information.

A motion image point here may correspond, by convention, to a point equidistant between two photoreceptors of a motion sensor (but other conventions can be used). A motion image point may thus be defined by a pair of coordinates X, Y in the orthonormal coordinate system. The index j ranging from 1 to 2N+2M, previously used to designate the rank of the motion sensors, can be used here to designate the rank of the corresponding image points, which also form four groups:

group G1: points $P_1$ to $P_N$ located on the top horizontal edge of the image matrix, group G2: points $P_{N+1}$ to $P_{2N}$ located on the bottom horizontal edge of the image matrix, group G3: points $P_{2N+1}$ to $P_{2N+M}$ located on the right-hand vertical edge of the image matrix, group G4: points $P_{2N+M+1}$ to $P_{2N+2M}$ located on the left-hand vertical edge of the image matrix, The X and Y coordinates of the motion image points, at an instant t corresponding to the capture of an image, are as follows:

group $G1$:

$P_1(t) = [X_1(t); Y_1(t)]$

...

$P_N(t) = [X_N(t); Y_N(t)]$ group $G2$:

$P_{N+1}(t) = [X_{N+1}(t); Y_{N+1}(t)]$

...

$P_{2N}(t) = [X_{2N}(t); Y_{2N}(t)]$ group $G3$:

$P_{2N+1}(t) = [X_{2N+1}(t); Y_{2N+1}(t)]$

...

$P_{2N+M}(t) = [X_{2N+M}(t); Y_{2N+M}(t)]$ group $G4$:

$P_{2N+M+1}(t) = [X_{2N+M+1}(t); Y_{2N+M+1}(t)]$

...

$P_{2N+2M}(t) = [X_{2N+2M}(t); Y_{2N+2M}(t)]$

Furthermore, it can be seen on FIG. 11 that the Y coordinates of the image points in the group G1 are equal to a constant H, that the Y coordinates of the image points in the group G2 are equal to −H, that the X coordinates of the image points in the group G3 are equal to a constant W and that the X coordinates of the image points in the group G4 are equal to −W.

Modeling the Global Motion

The example model used here is a model with four parameters enabling translations in X and Y, rotations in the image plane and about the image centre, and zoom actions to be estimated. The modeling of the global motion suggested here as an example thus comprises on a zoom factor α (or scale factor), a rotation parameter θ and two parameters Tx and Ty of translation in X and Y.

In accordance with the local motion measurements taken with the 1D motion sensors (or with 2D sensors if such sensors are preferred), an image point Pj(t) at a location X(t), Y(t) in an image captured at an instant t, is at a location X(t+dt), Y(t+dt) in the following image captured at an instant t+dt, having undergone a displacement of the translation, rotation, or zoom type. This displacement can be translated by the following system of equations:

For the Image Points in the Groups G1 and G2:

For j ranging from 1 to 2N:

$$X(j)(t+dt) = \alpha^* \cos\theta^* Xj(t) + \alpha^* \sin\theta^* Yj(t) + Tx \quad \text{equation (1)}$$

For the Image Points in the Groups G3 and G4:

For j ranging from 2N+1 to 2N+2M:

equation (2)

$$Y(j)(t+dt) = -\alpha \sin\theta \cdot Xj(t) + \alpha \cos\theta \cdot Yj(t) + Ty \quad (2)$$

These equations are used here to determine the X coordinates of the points in the groups G1, G2 at the instant t+dt and the Y coordinates of the points in the groups G3, G4 at the instant t+dt. Thus, the translation motions of the motion image points along the detection axes of the motion sensors with which they are associated can be determined without seeking to calculate their Y coordinates at the instant t+dt (for the groups G1, G2) or X coordinates at the instant t+dt (for the groups G3, G4). In other terms, only the translation component in the detection axis of each motion sensor need be taken into account. An extension of these equations in a two-dimensional system enabling all of the coordinates X,Y of each point at the instant t+dt to be expressed is possible by applying the equation (1) to the image points in the groups G3, G4 and by applying the equation (2) to the image points in the groups G1, G2.

Example of a Method for Estimating the Global Motion

FIG. 9 represents, in the form of a flowchart, an example of a method executed by the processor PROC to determine the global motion of a second image relative to a first image.

Calculation Principles

The initial positions of the motion image points in the first image at the instant t are determined by the positions of the motion sensors in the plane of the imager to which the system of Cartesian coordinates has been applied (Cf. FIG. 8). Using the local motion data Vh1, Vh2 or Vv1, Vv2, the final positions at the instant t+dt in the second image are determined by the following equations:

$$X_1(t+dt) = X_1(t) + [Vh1_1 - Vh2_1] \ast dt \quad \text{equations (3)}$$

$$\ldots$$

$$X_N(t+dt) = X_N(t) + [Vh1_N - Vh2_N] \ast dt$$

$$X_{N+1}(t+dt) = X_{N+1}(t) + [Vh1_{N+1} - Vh2_{N+1}] \ast dt$$

$$\ldots$$

$$X_{2N}(t+dt) = X_{2N}(t) + [Vh1_{2N} - Vh2_{2N}] \ast dt$$

$$Y_{2N+1}(t+dt) = Y_{2N+1}(t) + [Vv1_{2N+1} - Vv2_{2N+1}] \ast dt$$

$$\ldots$$

$$Y_{2N+M}(t+dt) = Y_{2N+M}(t) + [Vv1_{2N+M} - Vv2_{N+M}] \ast dt$$

$$Y_{2N+M+1}(t+dt) = Y_{2N+M+1}(t) + [Vv1_{2N+M+1} - Vv2_{2N+M+1}] \ast dt$$

$$\ldots$$

$$Y_{2N+2M}(t+dt) = Y_{2N+2M}(t) + [Vv1_{2N+2M} - Vv2_{2N+2M}] \ast dt$$

Furthermore, the system of equations (1) and (2) can be written in the form of a single matrix equation:

$$P = K \ast MX \quad \text{equation (4)}$$

i.e.:

$$\underbrace{\begin{pmatrix} X_1(t+dt) \\ \ldots \\ X_N(t+dt) \\ X_{N+1}(t+dt) \\ \ldots \\ X_{2N}(t+dt) \\ Y_{2N+1}(t+dt) \\ \ldots \\ Y_{2N+M}(t+dt) \\ Y_{2N+M+1}(t+dt) \\ \ldots \\ Y_{2N+2M}(t+dt) \end{pmatrix}}_{(P)} = \underbrace{\begin{pmatrix} X_1(t) & Y_1(t) & 1 & 0 \\ \ldots & \ldots & 1 & 0 \\ X_N(t) & Y_N(t) & 1 & 0 \\ X_{N+1}(t) & Y_{N+1}(t) & 1 & 0 \\ \ldots & \ldots & 1 & 0 \\ X_{2N}(t) & Y_{2N}(t) & 1 & 0 \\ Y_{2N+1}(t) & -X_{2N+1}(t) & 0 & 1 \\ \ldots & \ldots & 0 & 1 \\ Y_{2N+M}(t) & -X_{2N+M}(t) & 0 & 1 \\ Y_{2N+M+1}(t) & -X_{2N+M+1}(t) & 0 & 1 \\ \ldots & \ldots & 0 & 1 \\ Y_{2N+2M}(t) & -X_{2N+2M}(t) & 0 & 1 \end{pmatrix}}_{(K)} \ast \underbrace{\begin{pmatrix} \alpha\cos\theta \\ \alpha\sin\theta \\ Tx \\ Ty \end{pmatrix}}_{(MX)}$$

P is a column matrix containing the coordinates translated in X at the instant t+dt of the points in the groups G1, G2, and the coordinates translated in Y at the instant t+dt of the points in the groups G3, G4. MX is a column matrix forming a descriptor of the global motion and comprising the four parameters of the global motion to be determined. K is a matrix representative of the equations (1) and (2), containing the non-translated coordinates at the instant t of the points in the groups G1 to G4 and constants 1 and 0 representative of the system of equations.

It appears that the matrix K comprises known coordinates since all of the positions of the motion image points at the instant t depend on the arrangement of the motion sensors on the imager, as explained above. Thus, although certain coordinates are equal to the constants H, -H, W and -W mentioned above, the other coordinates X(t) of the points in the groups G1, G2 and Y(t) of the points in the groups G3, G4 are also constants in the orthonormal plane OXY.

Furthermore, thanks to the local motion data Vh1, Vh2 or Vv1, Vv2, the X and Y coordinates at the instant t+dt of the motion image points can also be determined using the equations (3) described above, such that the matrix P itself is known.

The embodiment of a method thus involves solving an equation with one unknown, i.e., the equation (4) the unknown of which is the matrix MX forming the descriptor of the global motion. However, the equation (4) comprises local motion data (integrated into the matrix P by means of the equations (3)) and is taken to be noised by errors on the local motion measurements. It can therefore be expected that the parameters of the global motion calculated by solving the equation (4) in a trivial manner will result in finding coordinates at the instant t+dt that will not match those calculated with the local motion data.

An embodiment of the method thus comprises an estimation process according to the least squares method, to solve the equation (4) by approximate values so as to get rid of the measurement errors as far as possible.

The embodiment of the method comprises an initialization step S0, a step S1 of calculating the matrix K (first estimation of the descriptor), two steps S2, S3 of verifying the descriptor and a final step S5 of calculating the parameters α, θ of the global motion model, the parameters Tx and Ty being known from the step S1 onwards. If the verification steps S2 and S3 are not conclusive, the calculation step S1 is repeated to obtain another estimation of the descriptor MX, after an intermediary step S4 aiming at correcting certain elements of the estimation before calculating the descriptor MX again.

Step S0

This preliminary step involves the processor preparing the calculation of the matrix MX by calculating the matrix P by means of the equations (3) and the local motion data Vh1$j$, Vh2$j$, Vv1$j$, Vv2$j$. It should be noted that the direction in which the motions are detected are taken into account in the equations (3) since the data Vh2$j$ and Vv2$j$ are modified by the negative sign. In principle, when a motion is measured during the time interval dt, it is a motion in a single direction and one of the data Vh1$j$ or Vh2$j$, respectively Vv1$j$ or Vv2$j$, is zero. In certain conditions of use causing high-frequency trembling or vibrations of the imager, it is however possible for the two data of opposite signs to be non zero and to offset one another in whole or in part.

Step S1

As the matrix P is determined and the matrix K is known, the processor calculates the descriptor MX using the equation (4), by applying the classical rules of matrix calculation:

$$MX = (K^T * K)^{-1} * K^T * P$$

$K^T$ being the transpose of the matrix K.

Step S2

In the step S2, the processor prepares the verification step S3 by calculating a matrix P' such that:

$$P' = K * MX$$

The matrix P' contains the "theoretical" translated coordinates of the motion image points, i.e., the translated coordinates calculated by means of the descriptor MX determined in the step S2, and not by means of the local motion data supplied by the imager.

Step S3

In the step S3, the processor determines, for each motion image point, the deviation between the theoretical translated coordinates calculated in the step S2 and the translated coordinates calculated in the step S0 using the equations (3), and compares this deviation with a threshold S:

$$|P' - P|/P' > S$$

At the end of the step S3, the processor determines the number of theoretical points having a deviation greater than S:

if this number is below a limit value which has previously been supplied to the processor, such as 10% of the total number of theoretical points for example, the descriptor MX is considered valid and the processor proceeds to the step S5 to calculate the terms α and θ (the terms Tx, Ty already being available in explicit form in the matrix MX calculated in the step S1), if this number is greater than the limit value, the processor proceeds to the step S4.

Step S4

In the step S4, the processor removes from the matrices P and K all the X or Y coordinates of the points in error (deviation greater than S), to obtain corrected matrices Pc and Kc:

$$P \rightarrow Pc$$

$$K \rightarrow Kc$$

The aim is indeed to remove a certain number of local motion measurements that are too far from those supplied by the descriptor MX, so that the local measurements are more in accord with the estimated global model.

The processor then returns to the step S1 and repeats the calculation of the descriptor MX using the corrected matrices Pc and Kc instead of the initial matrices P and K. The processor then executes the verification steps S2 and S3. In principle, the number of repetitions of the steps S1 to S3 is limited, and in some embodiments will not exceed one or two iterations. If, at the end of one or two iterations, the test step S3 is still not conclusive, the processor accepts the descriptor MX while possibly emitting an error signal if the error has already occurred several times during previous calculations concerning other images.

Step S5

In this final step, the processor calculates the terms α and θ by applying the following equations:

$$\alpha = \sqrt{[(\alpha \cos \theta)^2 + (\alpha \sin \theta)^2]}$$

$$\theta = \arctan(\alpha \sin \theta / \alpha \cos \theta)$$

As the parameters α, θ, Tx, Ty of the global motion model are known, the global motion between the two successive images is also known.

This method is applied by the processor to each new image received, taking the coordinates of the reference points (image points) of the previous image to be those that appear in FIG. 11, and a global motion descriptor of the image in relation to the previous image is associated with each image.

The processor can supply, together with the descriptor, a piece of information concerning the number of points in error that were accepted in the step S3, such information constituting a criterion of confidence that can be used to optimize any subsequent processing of the image, such as image compression processing for example using the descriptors associated with each image.

The global motion calculated upon each new image enables the processor to stabilize a video sequence by applying classical stabilization algorithms the description of which is outside the scope of the present application.

It will be understood by those skilled in the art that various alternative embodiments of the present invention are possible, both concerning the structure of imager and of the motion sensors as well as the method for estimating the global motion.

The motion sensors integrated into the imager according to embodiments of the present invention are not necessarily based on the mapping method and can be produced according to any one of the known methods described above, comparative tests can be employed to determine the one that is the most reliable and the best suited to a particular application intended, both in terms of measurement precision and size of the associated electronic circuits. The implantation areas of the motion sensors can further be shifted onto the silicon wafer so as to increase the number of motion sensors along the image matrix.

The embodiment of a method that has been described and the global motion model chosen are only examples of implementation of embodiments of the present invention. Here a linear global motion model has been chosen, but any other linear model of motion can be chosen and estimated while remaining within the scope of the present disclosure, with the formation of the equations being modified. Several known models are currently used in industry to estimate a global motion. They are more or less complex, and the more complex the model, the less the estimation of the motion parameters will be stable since the influence of the spurious local motion in the image will increase, since the estimation of the global motion according to embodiments of the present invention may be performed using a relatively small amount of local measurements of the motion (edges of the image). In practice, the choice of the global motion model thus depends on the intended application, on the precision and number of local motion measurements, and on the computation load available (increasing with the complexity of the model). A temporal model can also be chosen, defining the temporal evolution of the spatial model chosen. This evolution can either be linear, if the motion between the two images is considered to have no acceleration, or otherwise quadratic.

Furthermore, the example method described above has been implemented using local motion measurements supplied by an imager according to an embodiment of the present invention. As indicated above, the local motion measurements can also be estimated using points on the edge of the image, without having recourse to motion sensors integrated into the imager. The method then comprises a preliminary step of measuring the local motions during post-processing, by analyzing the pixels on the edges of the image.

The embodiment of a method of estimating the global motion that has just been described enables the computing power to be reduced compared to a classical technique of post-processing the images, including when the measurement of the local motions on the edges of the image is performed during post-processing.

A video acquisition device implementing embodiments of the present invention can be used for various applications with high added value, for which the estimation of the global motion generated by the imager is necessary. Although video stabilization was an initial object of some embodiments of the present invention, the recognition of the global motion within the framework of man-machine interface is another direct application of embodiments of the present invention. A video acquisition device according to embodiments of the present invention can be part of an interactive system in which the intentional motion is separated from the spurious motions to control certain actions. Another application of embodiments of the present invention is achieving a super image resolution, this technique also being based on the determination of the global motion (to increase the resolution of the images). Finally, video compression is also a field of application of embodiments of the present invention, since by knowing the global motion it is possible to offset the individual motions of the pixels (standard MPEG-4). Thus, in the most general case of scenes that can be considered plane, and containing few objects in singular motion, the motion of the majority of the pixels can be offset.

The term "computer-readable medium" as used herein refers to any medium that participates in providing instructions to a system or a processor for execution. Such a medium may take many forms, including but not limited to, non-volatile media and volatile media. Non-volatile media includes, for example, hard, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM and an EEPROM, a FLASH-EPROM, any other memory chip or cartridge, or any other medium from which a computer can read.

Motion sensors according to the differential methods are discussed in the following references:
"An Integrated Analog Optical Motion Sensor", J. Tanner, C. Mead, In S.-Y. Kung, R. Owen, and G. Nash (Eds.), VLSI Signal Processing, 2, pp. 59 ff. IEEE Press, 1986.
"A Multiplication Based Analog Motion Detection Chip", A. Moore and C. Koch, In B. Mathur and C. Koch (Eds.), Visual Information Processing: From Neurons to Chips, pp. 66-75, SPIE Vol. 1473, 1991.
"An Analog VLSI Saccadic Eye Movement System", T. Horiuchi, B. Bishofberger, C. Koch, In J. Cowan, G. Tesauro, and J. Alspector (Eds.), Advances in Neural Information Processing Systems, 6, pp. 5821-5889, San Mateo, Calif.: Morgan Kaufmann, 1994.
"Compact Real-Time 2-d Gradient-Based Analog VLSI Motion Sensor", Rainer A. Deutschmann, C. Koch, Int. Conf. On Advanced Focal Plane Arrays and Electronic Cameras, 1998.
"Computation of Smooth Optical Flow in a Feedback Connected Analog Network", Alan Stocker, R. Douglas, Advances in Neural Processing Systems 11, M. Kearns, S. Solla, and D. Cohn (Eds.), Cambridge, Mass., pp. 706-712, MIT Press, 1999.
"An Analog Motion Field Detection Chip for Image Segmentation", Ming-Han Lei, and Tzi-Dar Chiueh, IEEE Trans. on Circuits and Systems for Video Technology, Vol. 12, No. 5, May 2002.
"Analog VLSI Focal-Plane Array With Dynamic Connections for the Estimation of Piece-Wise Smooth Optical Flow", Alan Stocker, IEEE Transaction on Circuits and Systems-I, Vol. 51, No. 5, May 2004.

Motion detectors using mapping methods are discussed in the following references:
U.S. Pat. No. 5,998,780, U.S. Pat. No. 5,781,648, U.S. Pat. No. 6,023,521, U.S. Pat. No. 6,088,467, U.S. Pat. No. 6,212,288, U.S. Pat. No. 6,212,289, U.S. Pat. No. 6,020,953, U.S. Pat. No. 6,194,695, U.S. Pat. No. 6,384,905, U.S. Pat. No. 6,493,068, U.S. Pat. No. 6,683,678.
"Analog VLSI Architectures for Motion Processing: from Fundamental Limits to System Applications", R. Sarpeshkar, J. Kramer, G. Indiveri, C. Koch, Proceedings of the IEEE, Vol. 84, Issue: 7, pp. 969-987, July 1996.
"Pulse-Based Analog VLSI Velocity Sensors", Jorg Kramer, R. Sarpeshkar, and C. Koch, IEEE Transaction on Circuits and Systems-II: Analog and Digital Signal Processing, Vol. 44, No. 2, February 1997.
"A Focal Plane Visual Motion Measurement Sensor", Ralph Etienne-Cummings, J. Van der Spiegel, and P. Mueller, IEEE Transaction on Circuits and Systems-II: Fundamental Theory and Applications, Vol. 44, No. 1, January 1997.
"Feature Tracking Linear Optic Flow Sensor for 2-D Optic Flow Measurement", G. Barrows, Int. Conference on Control, Automation, Robotics, and Vision, Singapore, 1998.
"Pulse-Based 2-D Motion Sensors", Charles M. Higgins, R. A. Deutschmann, C. Koch, IEEE Transaction on Circuits and Systems-II: Analog and Digital Signal Processing, Vol. 46, No. 6, June 1999.

Motion detectors using so-called correlation methods (or frequential methods) are discussed in the following references:
"Direction-Selective Silicon Retina that Uses Null Inhibition", R. G. Benson, and T. Delbrück, Advances in Neural Information Processing Systems 4, D. S. Touretzky, Ed., San Mateo, Calif.: Morgan Kaufmann, pp. 756-763, 1991.
"Silicon Retina with Correlation-Based, Velocity-Tuned Pixels", T. Delbruck, Neural Networks, IEEE Transactions on Circuits and Systems, Vol. 4, Is. 3, pp. 529-541, May 1993.
"An Analog VLSI Model of the Fly Elementary Motion Detector", Reid R. Harrison, and C. Koch, Advances in Neural Information Processing Systems 10, M. I. Jordan, J. Kearns, S. A. Solla, eds. MIT Press, Cambridge, Mass., pp. 880-886, 1998.
"An Efficient Neuromorphic Analog Network for Motion Estimation", A. B. Torralba, J. Herault, Circuits and Systems I: Fundamental Theory and Applications, IEEE Transactions on Circuits and Systems I: Regular Papers, Volume: 46, Issue: 2, pp. 269-280, February 1999.
"A Neuromorphic aVLSI Model of Global Motion Processing in the Fly", Shih-Chii Liu, IEEE Transaction on Circuits and Systems-II: Analog and Digital Signal Processing, Vol. 47, No. 12, December 2000.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
capturing video images by,
measuring local motions on edges of the images;
estimating parameters of a global motion model using results of the measurement of local motions on the edges of the images;
calculating local motions using the estimated parameters of the global motion model; and
comparing the local motions calculated and the local motions measured on the edges of the image, wherein the estimating, calculating and comparing are performed by one or more configured electronic devices.

2. The method of claim 1, further comprising:
determining whether the estimated parameters of the global motion model at least partially coincide with the local motions measured.

3. The method of claim 1, wherein the measurement of local motions is taken on four edges of the image.

4. The method of claim 1, wherein the measurement of local motions on the edges of the images is taken according to a single motion detection axis parallel to the edges of the images, and according to two directions of displacement along the detection axis.

5. The method of claim 1, comprising providing and using an imager comprising:
a central region for capturing images comprising light-sensitive cells; and
a peripheral region equipped with motion sensors, supplying local motion data.

6. The method of claim 5, wherein the peripheral region completely surrounds the central region.

7. The method of claim 5, wherein the peripheral region comprises groups of motion sensors each comprising a single row of motion sensors.

8. The method of claim 5, wherein the peripheral region comprises unidirectional motion sensors having a single motion detection axis and two displacement detection directions along the motion detection axis.

9. The method of claim 5, wherein:
the capturing of the images is performed in progressive mode, and
acquisition of local motion data associated with an image is performed in progressive mode and extends in a time window delimited by a first instant corresponding substantially to a start of the capture of a previous image and a second instant corresponding substantially to an end of the capture of the image.

10. The method of claim 1, wherein the parameters of the global motion model comprise an angle of rotation, a zoom factor, and two parameters of translation according to orthogonal axes.

11. The method of claim 1, comprising a step of stabilizing the video images conducted using the estimated parameters of the global motion model.

12. The method of claim 1, further comprising:
compensating for local motions attributable to an animated object entering the images.

13. A method, comprising:
capturing a first and a second image;
measuring local motions at points of a first set of image points, during an acquisition period extending between the capture of the first image and the capture of the second image; and
estimating parameters of a global motion model by:
calculating presumed positions of the image points in the first set of image points on the second image according to their positions on the first image, using the local motions measured on the edges of the image, to obtain a second set of image points;
calculating initial parameters of the global motion model using the second set of image points;
calculating theoretical positions of the image points in the first set on the second image according to their positions on the first image, using the initial parameters of the global motion model, to obtain a third set of image points;
comparing the second and third sets of image points; and
removing, from the first set of image points, image points having a deviation greater than a first threshold between their positions in the second set of image points and their positions in the third set of image points, if the number of image points to be removed is above a second threshold, wherein the estimating is performed by a configured electronic device.

14. The method of claim 13, comprising calculating new parameters of the global motion model, after removing image points from the first set of image points.

15. The method of claim 13 wherein the parameters of the global motion model comprise an angle of rotation, a zoom factor, and two parameters of translation according to orthogonal axes.

16. A video image acquisition device, comprising:
an imager having:
a first region equipped with light-sensitive cells for capturing images; and
a second region on an edge of the first region, equipped with motion sensors enabling local motions to be measured on the edges of the images simultaneously with the capture of the images, wherein the video imager is configured to supply local motion data in addition to video data; and
a calculating device configured to:
estimate parameters of a model of global motion between successive images supplied by the imager, using a result of a measurement of local motions on edges of the images taken by the imager;
calculate local motions using the estimated parameters of the global motion model; and
compare the local motions calculated and the local motions measured on the edges of the image.

17. The device according to claim 16, wherein the calculating device is configured to estimate the parameters of the global motion between a first and a second image by:
from an initial set of image points on the first image, calculating presumed positions of the image points on the second image according to their positions on the first image, using the local motions measured by the imager, to obtain a second set of image points;

calculating initial parameters of the global motion model using the second set of image points;

calculating theoretical positions of the image points in the initial set on the second image according to their positions on the first image, using the initial parameters of the global motion model, to obtain a third set of image points;

comparing the second and third sets of image points; and selectively removing from the first set of image points, image points having a deviation greater than a first threshold between their positions in the second set and their positions in the third set, when the number of image points having the deviation greater than the first threshold is above a second threshold.

18. The device according to claim 17, wherein the calculating device is configured to calculate new parameters of the global motion model, after image points having the deviation greater than the first threshold have been removed from the first set of image points.

19. The device according to claim 16, wherein the parameters of the global motion model comprise an angle of rotation, a zoom factor, and two parameters of translation according to orthogonal axes.

20. The device according to claim 16, wherein the calculating device is configured to stabilize video images using the estimated parameters of the global motion model.

21. A non-transitory computer-readable memory medium containing instructions for causing an imaging device to process video images by generating control signals to cause the imaging device to:

measure local motions on edges of the images;

estimate parameters of a global motion model using results of the measurement of local motions on the edges of the images;

calculate local motions using the estimated parameters of the global motion model; and compare the local motions calculated and the local motions measured on the edges of the image.

22. The non-transitory computer-readable memory medium of claim 21, wherein the instructions further cause the imaging device to:

capture a first and a second image, wherein measuring local motions comprises measuring local motions at points of a first set of image points during an acquisition period extending between the capture of the first image and the capture of the second image; and estimating parameters of a global motion model comprises:

calculating a second set of image points using the local motions measured on the edges of the image;

calculating initial parameters of the global motion model using the second set of image points;

calculating a third set of image points using the initial parameters of the global motion model;

comparing the second and third sets of image points; and modifying the initial parameters of the global motion model based on the comparison of the second and third sets of image points.

23. The non-transitory computer-readable medium of claim 21 wherein the parameters of the global motion model comprise an angle of rotation, a zoom factor, and two parameters of translation according to orthogonal axes.

* * * * *